United States Patent [19]

Paschke et al.

[11] Patent Number: 5,286,269
[45] Date of Patent: Feb. 15, 1994

[54] PRODUCTION OF COMPOSITE GLASS POWDER OF ANY DESIRED PARTICLE SIZE FROM A PARTICULATE MULTICOMPONENT MIXTURE

[75] Inventors: Hartmut Paschke, Ergolding; Hermann Ditz, Landshut, both of Fed. Rep. of Germany

[73] Assignee: Schott Glaswerke, Mainz, Fed. Rep. of Germany

[21] Appl. No.: 969,880

[22] Filed: Nov. 2, 1992

[30] Foreign Application Priority Data

Nov. 2, 1991 [DE] Fed. Rep. of Germany ....... 4136115

[51] Int. Cl.$^5$ .................. C03B 23/20; C03C 3/072
[52] U.S. Cl. ................... 65/18.1; 65/21.1; 65/18.3; 65/111; 501/74; 501/75; 501/14
[58] Field of Search ........ 65/18.1, 18.3, 21.1, 65/21.5, 111, 112, 144, 33; 501/14, 15, 16, 74, 75, 81

[56] References Cited

U.S. PATENT DOCUMENTS

| | | | |
|---|---|---|---|
| 2,517,019 | 8/1950 | Nordberg | 49/92 |
| 3,488,216 | 1/1970 | Martin | 117/125 |
| 3,904,426 | 9/1975 | Frieser et al. | 501/15 |
| 4,006,028 | 2/1977 | Nofziger | 501/15 |
| 4,355,115 | 10/1982 | Hang et al. | 501/26 |
| 4,405,722 | 9/1983 | Kokubu et al. | 501/15 |
| 4,589,899 | 5/1986 | Hudecek | 501/15 |
| 4,774,208 | 9/1988 | Yamanaka et al. | 501/15 |
| 4,775,647 | 10/1988 | Smith, III | 501/15 |
| 4,818,731 | 4/1989 | Mizutani et al. | 501/16 |
| 5,096,620 | 3/1992 | Ditz et al. | 501/32 |
| 5,145,803 | 9/1992 | Daimer et al. | 501/15 |

FOREIGN PATENT DOCUMENTS 0040525 11/1987 European Pat. Off. .
2248834 4/1992 United Kingdom .

OTHER PUBLICATIONS

Chemical Abstracts, vol. 112, No. 10, Mar. 5, 1990, Abstract No. 82811h [Abstract of JP 1,183,444 (Jul. 21, 1989)].

*Primary Examiner*—W. Gary Jones
*Assistant Examiner*—Steven P. Griffin
*Attorney, Agent, or Firm*—Millen, White, Zelano, & Branigan

[57] ABSTRACT

For the production of a composite glass powder of any particle size from a fine particle size, multi-component mixture of a low-melting glass powder, fillers, and additives, the fine particle size, multicomponent mixture is sintered for 10-60 minutes at a temperature at which the base glass has a viscosity of $10^5$ to $10^{6.5}$ dPas, and the resultant sintered cake is ground to a powder of the desired particle size. If the multicomponent mixture comprises components decomposable with the release of gas, e.g., copper carbonate, the latter are decomposed prior to sintering at a temperature below the sintering temperature. The resultant composite glass powder containing copper oxide can be used for coating varistors.

7 Claims, No Drawings

PRODUCTION OF COMPOSITE GLASS POWDER OF ANY DESIRED PARTICLE SIZE FROM A PARTICULATE MULTICOMPONENT MIXTURE

BACKGROUND OF THE INVENTION

For coating electric and electronic components, e.g., varistors, composite glass powders are used which, suspended in a suitable liquid, are applied in a layer to the component by spraying with a spray gun or by other suitable processes; and the resultant component is subjected to glaze baking to form a solid firmly bound to the component, e.g., ZnO ceramic in varistors. Composite glass powders are used, since the required mechanical, electrical, and chemical properties of the coating often cannot be achieved with a pure glass powder.

Composite glass powders generally comprise approximately 60–70% by weight of a base glass, especially a lead borate glass; approximately 15–20% by weight of at least one filler to match the expansion coefficient; 5–13% by weight of a compound for achieving specific electrical properties of the coating; and approximately 7–13% by weight of $SiO_2$ for improving the flow behavior. The base glass forms a solid coating, incorporating the other components therein.

The filler, added in an amount of 15–20% by weight, matches the expansion coefficient of the coating to that of the base. Suitable fillers are, e.g., β-eucryptite, cordierite, mullite, zirconium silicate or other refractory materials, lead titanate, and willemite, as well as materials designated as a "solid solution", such as, e.g., $SnO_2$—$TiO_2$. The fillers can be produced naturally or synthetically. Especially preferred are β-eucryptite and cordierite.

The mixture further contains 5–13% by weight of a compound with which certain electrical properties, e.g., current-voltage characteristics, can be adjusted. Such compounds include, for example, copper carbonate, copper oxide, chromium oxide, silver carbonate, bismuth oxide, magnesium oxide, and manganese oxide.

Especially advantageous is the use of copper carbonate, since the latter decomposes during the coating process under normal operating temperatures to a copper oxide having a very large specific surface; therefore, the resultant oxide can be readily incorporated in the base glass.

As another additive, the composite glass powder also generally contains 7–13% by weight of $SiO_2$ for improving flow behavior. The $SiO_2$ can be present in the composite glass powder in the form of quartz powder, as well as in the form of pyrogenic silicic acid.

The base glass powder, as well as the fillers and additives, are present in the composite glass powder in a very fine particle size. The fillers, which are added to match the coefficient of expansion of the coating to the object to be coated, in general to lower the expansion coefficient, normally have a substantially different expansion coefficient from that of the base glass. If the fillers have an excessively large particle size, microcracks in the glazing layer can form, resulting in deterioration of the mechanical and electrical properties of the layer. The fillers used for matching the expansion coefficient, therefore, normally have an average particle size of less than 15 μm. Also, the base glass present in the composite glass powder normally has an average particle size of 4–15 μm, especially a particle size of 6–12 μm; otherwise, the particulate glass is not suitable for uniform incorporation of fillers and additives.

The compounds used for modifying the electrical properties, as well as the $SiO_2$ added for improving flow behavior, are intended to react during glazing with the base glass, i.e., to be at least partially dissolved in the base glass. The smaller the particle size and the larger the specific surface area of these components, the less the time required for dissolution. Thus, the slower the reaction of these additives with the base glass powder, the finer the additives must be. Silicon dioxide powders dissolve comparatively well so that an average particle size of a maximum of 10 μm can be used. Other additives, such as, e.g., the compounds used for adjusting the electrical properties, especially CuO, may be used only with a maximum average particle size of 4 μm because of their poor solubility in the base glass. Thus, it is further preferred if these slightly soluble additives are added not as oxides, but in the form of compounds which are decomposable below the glazing temperature. During decomposition, such compounds result in very reactive powders having a large specific surface, which greatly contributes to improved solubility of the additives into the base. It is here to be noted that the addition of additives for improving or modifying the electrical properties during the melting step used for the production of the base glass is, in general, not possible, since such an addition results in the separation and crystallization of the base glass.

The decomposable compounds added to the powder in order to modify the electrical properties of the composite are decomposed by heating during the glaze baking step. However, this heating reaction requires time; thus, during the glaze baking step, the product either has to be heated very slowly or a pause in the heating at the decomposition temperature must be employed, thereby extending the baking process. Prolonging the baking process results not only in long cycle times, but can also reduce the quality of the components to be coated.

Another drawback of known composite glass powders is that they must be mixed with a significantly large amount, e.g., 35–40%, of suspension medium, e.g., water, because of the fineness of the base glass powder and additives so as to produce an easily processable, e.g., sprayable, slip. This relatively high proportion of suspension medium results in serious drawbacks. In the drying of the layer applied by spraying, immersion, or other suitable process, a substantial drying shrinkage occurs, and associated therewith is the great danger of crack formation, which results in defective coatings. Further, it is not possible with slips which contain a high proportion of suspension medium to apply sufficiently thick layers, since the layers tend to run.

SUMMARY OF THE INVENTION

One object of the invention, therefore, is to provide a composite glass powder that can be produced with a relatively large average particle size, without an unacceptable diminution in the physical and electrical properties of the products made therewith.

Another object is to provide sprayable compositions containing the glass composite.

Still another object is to provide products, such as varistors, for example, made with the glass composite of the invention.

Upon further study of the specification and appended claims, further objects and advantages of this invention will become apparent to those skilled in the art.

DETAILED DESCRIPTION

To attain these objects, a process is provided for producing a composite glass powder of any desired particle size from a fine particle size, multicomponent mixture, comprising a base glass powder, at least one of a filler and additive by sintering the fine particle size, multicomponent mixture for 10–60 minutes at a temperature at which the base glass has a viscosity of $10^5$ to $10^{6.5}$ dPas and grinding resultant sintered cake to a powder of the desired particle size.

The components soluble in the base glass are partially dissolved by the base glass and, together with all other fillers and additives, are sintered to a porous sintered glass cake at a temperature corresponding to a viscosity of $10^5$ dPas. If this temperature is exceeded, the individual components of the composite glass powder dissolve excessively in the base glass, resulting in deterioration of the physical properties of the base glass. Similarly, if a temperature lower than that corresponding to a viscosity of the base glass of $10^{6.5}$ dPas is employed, the reaction between the base glass and the fillers and additives is insufficient to form a satisfactory bond between the base glass and the other components.

Within the temperature range which corresponds to a viscosity of $10^{6.5}$–$10^5$ dPas, a porous sintered cake results, from which a composite glass powder can be produced by crushing. The resultant composite glass powder has the good physical and electrical properties of the starting material, without the drawbacks associated with the fineness of the original components. The expansion-modifying additives remain fully effective, since their reaction with the other components is minimal.

If, among the additives, there is a compound which is converted with the release of gas to a reactive additive, e.g., copper carbonate, the multicomponent mixture to be sintered is first suitably heated to a temperature below the sintering temperature, at which this compound is decomposed with the release of gas. The mixture is maintained at this temperature until the decomposable compound has decomposed, and thereafter it is heated to the sintering temperature. By maintaining the composition at the decomposition temperature, the decomposable compound decomposes without any other damaging reactions occurring.

Especially suitable is the use of this process in the production of a composite glass powder for coating varistors. For the production of such a composite glass powder, a mixture comprising:

60–70% by weight of a lead borate glass powder having an average particle size of less than 15 $\mu$m,
15–20% by weight of a filler also having an average particle size of less than 15 $\mu$m,
5–13% by weight of copper carbonate having an average particle size of less than 5 $\mu$m, and
7–13% by weight of $SiO_2$ having an average particle size of less than 10 $\mu$m is maintained at a temperature of 220°–320° C. for 30–60 minutes for the decomposition of the copper carbonate, and the resultant product is then sintered at a temperature which corresponds to a viscosity of the base glass of $10^5$–$10^{6.5}$ dPas for 10–60 minutes.

Preferably, the lead borate glass is a glass of the composition (in % by weight on an oxide basis) 0–5 $SiO_2$, 5–20 $B_2O_3$, 60–90 PbO, as well as 0–5 $Al_2O_3$, 0–30 ZnO, 0–5 BaO, and 0–3 F. Especially good results are achieved using a glass of the composition 0–2 $SiO_2$, 13–16 $B_2O_3$, 82–87 PbO, and 0–2 $Al_2O_3$. Also, a glass of the composition 86 PbO and 14 $B_2O_3$ is very good.

As a filler for modifying the thermal coefficient of expansion, preferably $\beta$-eucryptite and/or cordierite and/or mullite is used. If the copper added is in the form of very finely ground copper oxide rather than copper carbonate, the pause in the heating cycle for decomposing the copper carbonate can be eliminated, and the composite can be heated immediately to the sintering temperature at any rate desired.

After sintering, the porous sintered cake obtained is ground to a sintered powder of a suitable particle size distribution. To assure good processability of the powder, e.g., by spraying or immersion, average particle sizes of 7–15 $\mu$m are preferred. In this range of these particle sizes, very thick layers can also be deposited without the layers tending to run. Further, by virtue of the sintering step of this invention, it is possible to employ a relatively low amount of water in the sprayable mixture, for example, less than 35% by weight of water. Accordingly, the solids content of the sprayable mixture is high compared to prior art mixtures. This results in several advantages: For example, the coating time relative to a coating procedure with non-presintered powder can be shortened by about 50%, which, in turn, results in a considerably lower thermal stress of the parts to be coated.

The process is particularly useful when composite glass powders, which can be produced only with the aid of very fine particle size individual components, are desired for processing reasons, to be converted to larger particle sizes, and/or when the composite glass powder must contain certain substances or certain compounds in the glazing produced from the latter, which, however, cannot be introduced in the glass during the melt, since they negatively influence glass formation, i.e., when the total number of components necessary for the later resulting glazing cannot be melted primarily as glass.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents, and publications, cited herein, and of corresponding German Application P 41 36 115.6-45, filed Nov. 2, 1991, are hereby incorporated by reference.

EXAMPLE

A mixture is formed of:
63% by weight of a lead borate base glass having a composition of 86% by weight of PbO and 14% by weight of $B_2O_3$ and an average particle size of 12 $\mu$m.
19% by weight of $\beta$-eucryptite having an average particle size of 8 $\mu$m as filler,
9% by weight of quartz powder having an average particle size of 9 $\mu$m, and 9% by weight of $CuCO_3$ having an average particle size of 3 μm.

This mixture was heated to a temperature of 260° C. and maintained at this temperature for 30 minutes so as to decompose the $CuCO_3$ to CuO. The mixture was then heated to 450° C. and maintained at this temperature for 20 minutes. At this temperature, the base glass has a viscosity of $10^5$ dPas. The obtained sintered cake was then cooled and ground to a powder having an average particle size of 12 μm. A suspension having a content of 72% by weight of the composite glass powder was produced from the powder by adding demineralized water.

This suspension was sprayed on the surface of cylindrical varistor elements to obtain a layer thickness of the sprayed-on layer of 200 μm. After drying, the layer was baked at 600° C. for 20 minutes to produce a glaze of excellent quality.

If, for comparison, the unsintered powder mixture were used for coating, substantially more water has to be added to the powder for the production of a sprayable suspension so that the solid portion of the suspension is only 60-65% by weight. Using this suspension, a layer thickness of a maximum of only 70 μm could be obtained by spraying the suspension on the surface of the cylindrical varistor element. In baking this layer at a temperature of 600° C., the time had to be extended to 2-3 hours. The produced glazing layers were partially seedy, which resulted in inferior electrical values (inferior flashover resistance) of the varistors.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A process for the production of composite glass powder of a desired particle size made from a fine particle size, multicomponent mixture, comprising a powder of a base glass and material selected from the group consisting of a filler, an additive, and mixtures thereof, said process comprising sintering the fine particle size, multicomponent mixture for 10-60 minutes at a temperature at which the base glass has a viscosity of $10^5$-$10^{6.5}$ dPas to form a sintered cake, cooling the cake, and grinding the resultant cooled sintered cake to a powder of the desired particle size.

2. A process according to claim 1, wherein the multicomponent mixture comprises a component decomposable with release of gas, and said component is decomposed at a temperature below the sintering temperature and before the sintering step.

3. A process according to claim 1, wherein the fine particle size, multicomponent mixture comprises 60-70% by weight of a lead borate glass powder having an average particle size of less than 15 μm, 15-20% by weight of a filler having an average particle size of less than 15 μm, 5-13% by weight of $CuCO_3$ having an average particle size of less than 5 μm, and 7-13% by weight of $SiO_2$ having an average particle size of less than 10 μm, said multicomponent mixture having been heated at a temperature of 220°-320° C. for 30-60 minutes to decompose the $CuCO_3$ prior to the sintering step.

4. A process according to claim 3, wherein the lead borate glass powder is of the composition (in % by weight on an oxide basis) of 0-5 $SiO_2$, 5-20 $B_2O_3$, 60-90 PbO, 0-5 $Al_2O_3$, 0-30 ZnO, 0-5 BaO, and 0-3 F.

5. A process according to claim 4, wherein the filler is β-eucryptite and/or cordierite.

6. A process according to claim 3, wherein the filler is β-eucryptite and/or cordierite.

7. A process for the production of a sintered cake made from a fine particle size, multicomponent mixture, comprising a powder of a base glass and material selected from the group consisting of a filler, an additive, and mixtures thereof, said process comprising sintering the fine particle size, multicomponent mixture for 10-60 minutes at a temperature at which the base glass has a viscosity of $10^5$-$10^{6.5}$ dPas to form a sintered cake, and cooling the cake.

* * * * *